(12) United States Patent
Hutzen et al.

(10) Patent No.: US 10,408,382 B2
(45) Date of Patent: Sep. 10, 2019

(54) EXTRUSION-BLOW-MOLDED FUEL TANK OF THERMOPLASTIC MATERIAL AND METHOD FOR THE PRODUCTION THEREOF

(71) Applicant: Kautex Textron GmbH & Co. KG, Bonn (DE)

(72) Inventors: Markus Hutzen, Sankt Augustin (DE); Ulrich Karsch, Niederkassel (DE); Christoph Mehren, Konigswinter (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 0 days.

(21) Appl. No.: 14/397,372

(22) PCT Filed: Mar. 14, 2013

(86) PCT No.: PCT/EP2013/000753
§ 371 (c)(1),
(2) Date: Oct. 27, 2014

(87) PCT Pub. No.: WO2013/159852
PCT Pub. Date: Oct. 31, 2013

(65) Prior Publication Data
US 2015/0083719 A1 Mar. 26, 2015

(30) Foreign Application Priority Data

Apr. 27, 2012 (DE) .................. 10 2012 008 394

(51) Int. Cl.
*F17C 1/16* (2006.01)
*B29C 49/04* (2006.01)
(Continued)

(52) U.S. Cl.
CPC .............. *F17C 1/16* (2013.01); *B29C 49/04* (2013.01); *B29C 49/20* (2013.01); *B29C 51/12* (2013.01);
(Continued)

(58) Field of Classification Search
CPC ......... F17C 1/16; B65D 90/02; B65D 90/021; B65D 90/04; B65D 90/041; B60K 2015/03046; B60K 2015/03059
(Continued)

(56) References Cited

U.S. PATENT DOCUMENTS 4,435,240 A 3/1984 Knaus et al.
4,806,298 A * 2/1989 Wilkinson ........... B26D 7/2614
118/36

(Continued)

FOREIGN PATENT DOCUMENTS

CN 101489759 A 7/2009
DE 1780682 B1 2/1977
(Continued)

OTHER PUBLICATIONS

Acrylonitrile Butadiene Styrene (ABS) Typical Properties Generic ABS https://plastics.ulprospector.com/generics/1/c/t/acrylonitrile-butadiene-styrene-abs-properties-processing.*

(Continued)

*Primary Examiner* — Andrew T Kirsch
*Assistant Examiner* — Don M Anderson
(74) *Attorney, Agent, or Firm* — Grossman, Tucker, Perreault & Pfleger, PLLC

(57) ABSTRACT

The invention relates to an extrusion-blow-molded fuel tank (1) of thermoplastic material comprising a tank wall of a composite of various layers obtained in various production operations, at least one first layer comprising at least one shell-shaped supporting shell (8) and a second layer of a thermoplastic material forming an adhesive bond with the supporting shell (8), and the supporting shell (8) having a greater strength than the second layer. The supporting shell (8) forms an inner layer of the tank and the second layer forms an outer skin of the tank, two supporting shells within the tank forming a supporting cage or a supporting housing.

27 Claims, 9 Drawing Sheets

Figure 7:
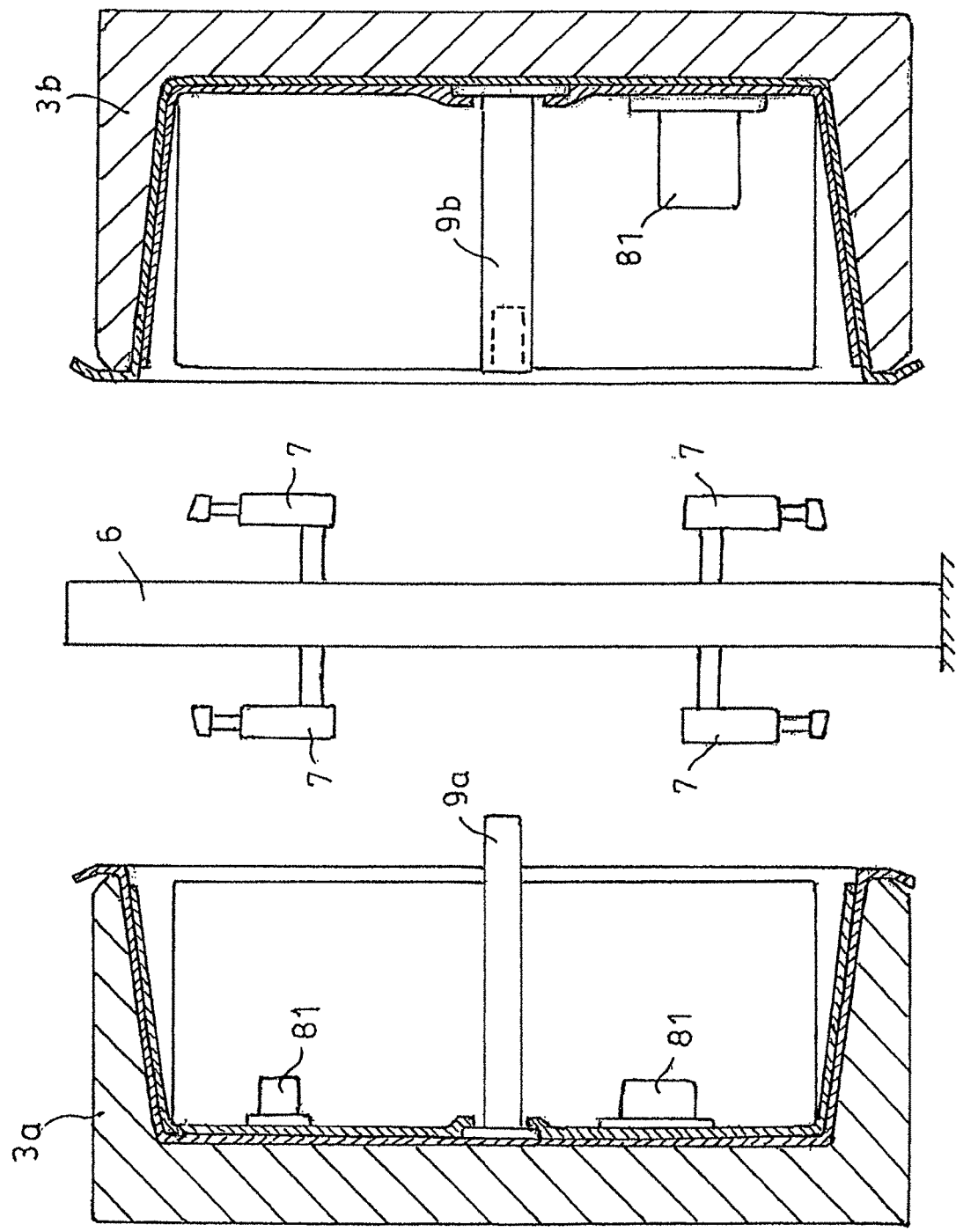

(51) Int. Cl.
- *B29C 49/20* (2006.01)
- *B60K 15/03* (2006.01)
- *B29C 51/12* (2006.01)
- *B29D 22/00* (2006.01)
- *B32B 37/02* (2006.01)
- *B32B 37/24* (2006.01)
- *B65D 90/02* (2019.01)
- *B29C 49/22* (2006.01)
- *B29L 31/00* (2006.01)
- *B29C 51/26* (2006.01)
- *B29C 48/07* (2019.01)
- *B29C 48/00* (2019.01)

(52) U.S. Cl.
CPC .............. *B29D 22/00* (2013.01); *B32B 37/02* (2013.01); *B32B 37/24* (2013.01); *B60K 15/03177* (2013.01); *B65D 90/02* (2013.01); *B29C 48/0017* (2019.02); *B29C 48/07* (2019.02); *B29C 49/22* (2013.01); *B29C 51/267* (2013.01); *B29C 2049/2013* (2013.01); *B29C 2049/2065* (2013.01); *B29L 2031/7172* (2013.01); *B32B 2305/34* (2013.01); *B60K 2015/03032* (2013.01); *B60K 2015/03046* (2013.01); *B60K 2015/03453* (2013.01)

(58) Field of Classification Search
USPC ...................................... 220/62.22, 563, 562
See application file for complete search history.

(56) References Cited

U.S. PATENT DOCUMENTS

| | | | | |
|---|---|---|---|---|
| 5,080,850 A * | 1/1992 | Holloway | ............. | B29C 70/443 156/145 |
| 5,194,212 A * | 3/1993 | Bonnett | ................. | B29C 49/24 156/245 |
| 5,758,796 A * | 6/1998 | Nishimura | ................ | F17C 1/06 220/590 |
| 6,135,306 A * | 10/2000 | Clayton | ........... | B60K 15/03177 220/501 |
| 6,138,859 A * | 10/2000 | Aulph | .................... | B60K 15/03 137/574 |
| 6,338,420 B1 * | 1/2002 | Pachciarz | ........ | B60K 15/03177 220/4.13 |
| 6,485,668 B1 * | 11/2002 | Murphy | .................. | B29C 49/24 156/156 |
| 6,543,426 B1 | 4/2003 | Schwochert | | |
| 6,612,458 B2 | 9/2003 | Balzer et al. | | |
| 6,857,534 B1 * | 2/2005 | Keller | .................... | B29C 65/20 220/4.13 |
| 7,455,190 B2 | 11/2008 | Potter et al. | | |
| 2002/0088805 A1 * | 7/2002 | Roy | .................... | B65D 90/022 220/560.03 |
| 2002/0094427 A1 * | 7/2002 | Edwards | ................. | B29C 51/12 428/297.4 |
| 2002/0113694 A1 | 8/2002 | Muirhead | | |
| 2004/0129708 A1 | 7/2004 | Borchert et al. | | |
| 2008/0061470 A1 | 3/2008 | Borchert et al. | | |
| 2008/0149636 A1 * | 6/2008 | Carter | ....................... | F17C 1/06 220/62.22 |
| 2009/0078705 A1 * | 3/2009 | Ramsay | .................. | B60K 15/077 220/562 |
| 2011/0215102 A1 | 9/2011 | Boecker et al. | | |
| 2012/0024868 A1 | 2/2012 | Menke | | |
| 2012/0161371 A1 | 6/2012 | Lichtenauer et al. | | |

FOREIGN PATENT DOCUMENTS

| | | |
|---|---|---|
| DE | 19803965 A1 | 8/1999 |
| DE | 10139782 A1 | 5/2002 |
| FR | 2914874 A1 | 10/2008 |
| WO | 2012007116 A2 | 1/2012 |

OTHER PUBLICATIONS

Polyphenylene Sulfide (PPS) Typical Properties Generic PPS https://plastics.ulprospector.com/generics/41/c/t/polyphenylene-sulfide-pps-properties-processing.*

English language PCT International Search Report and Written Opinion dated Jul. 16, 2013, received in corresponding PCT Application No. PCT/EP13/00753, 7 pgs.

* cited by examiner

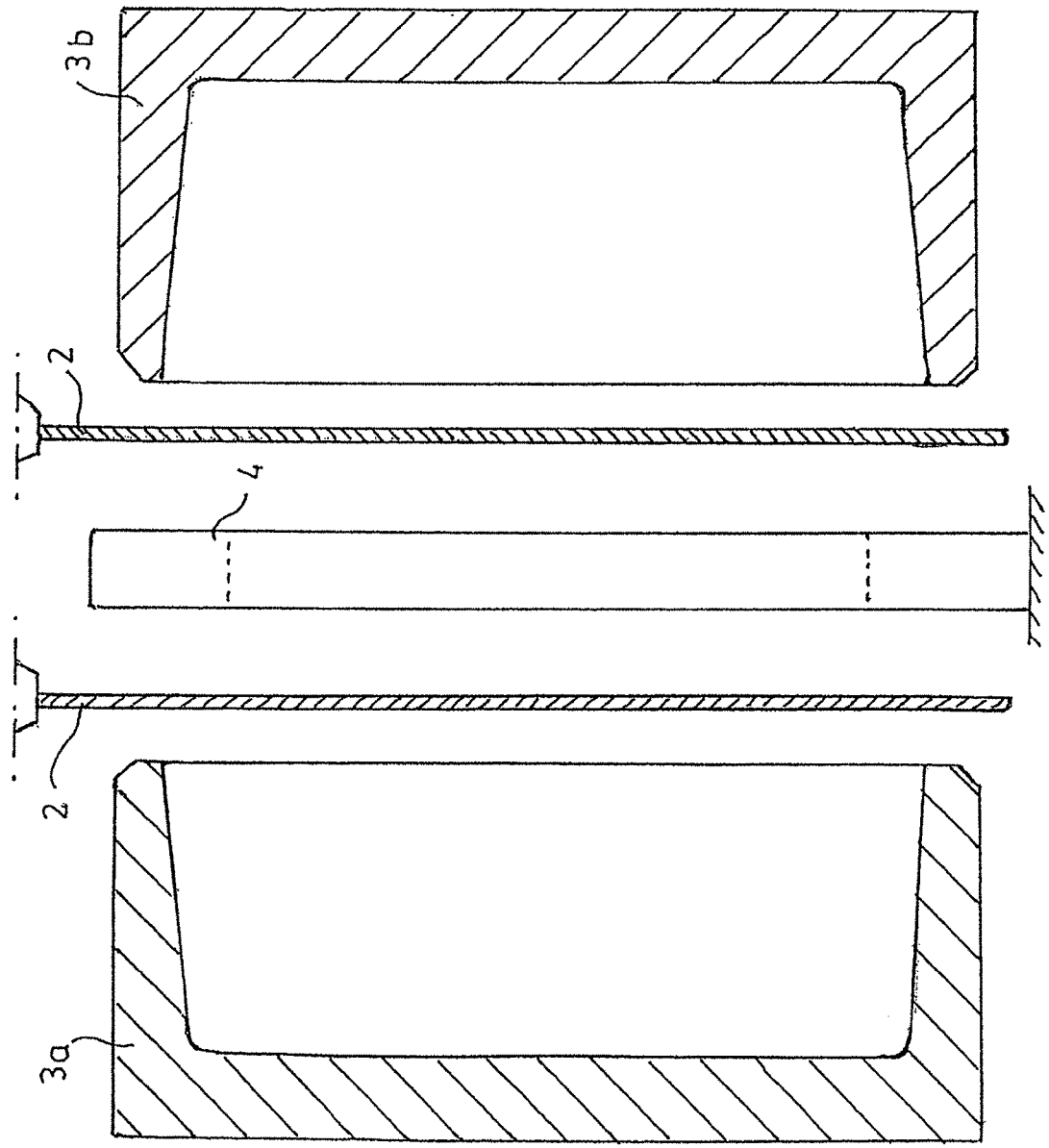

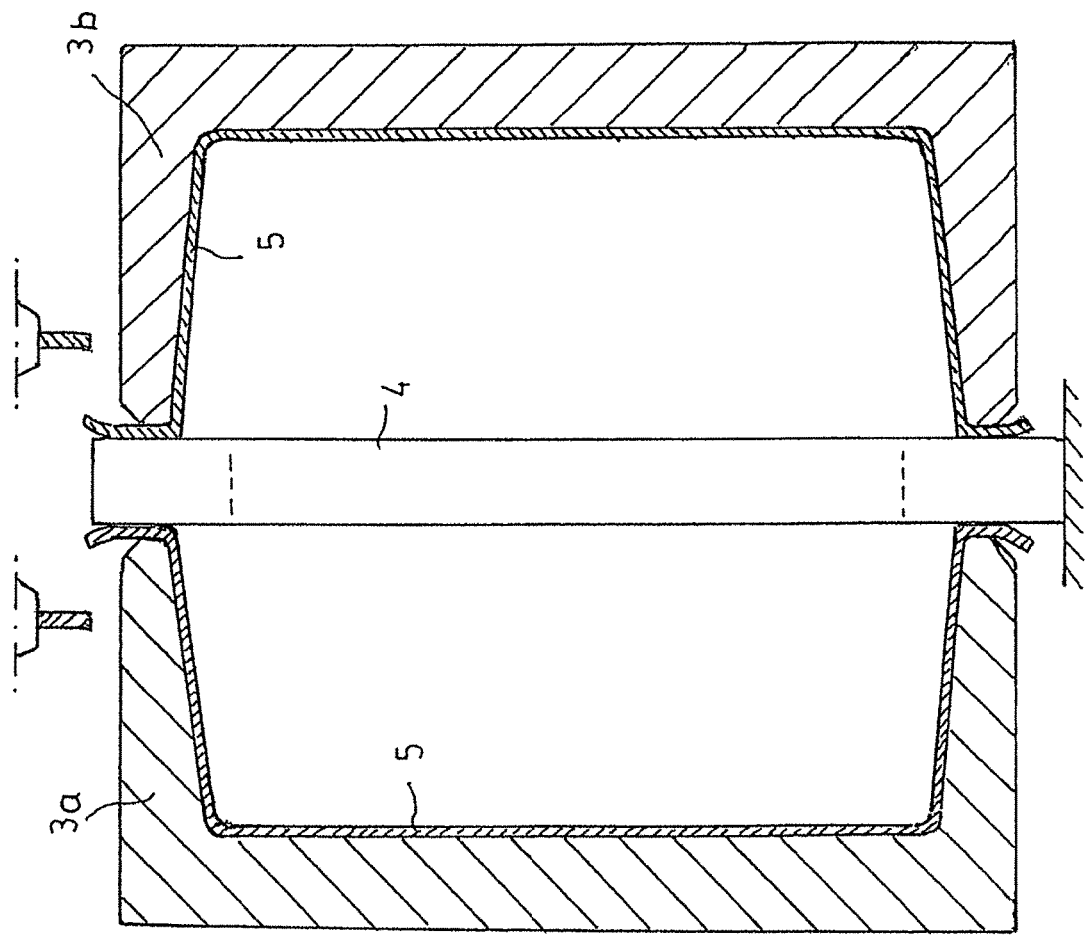

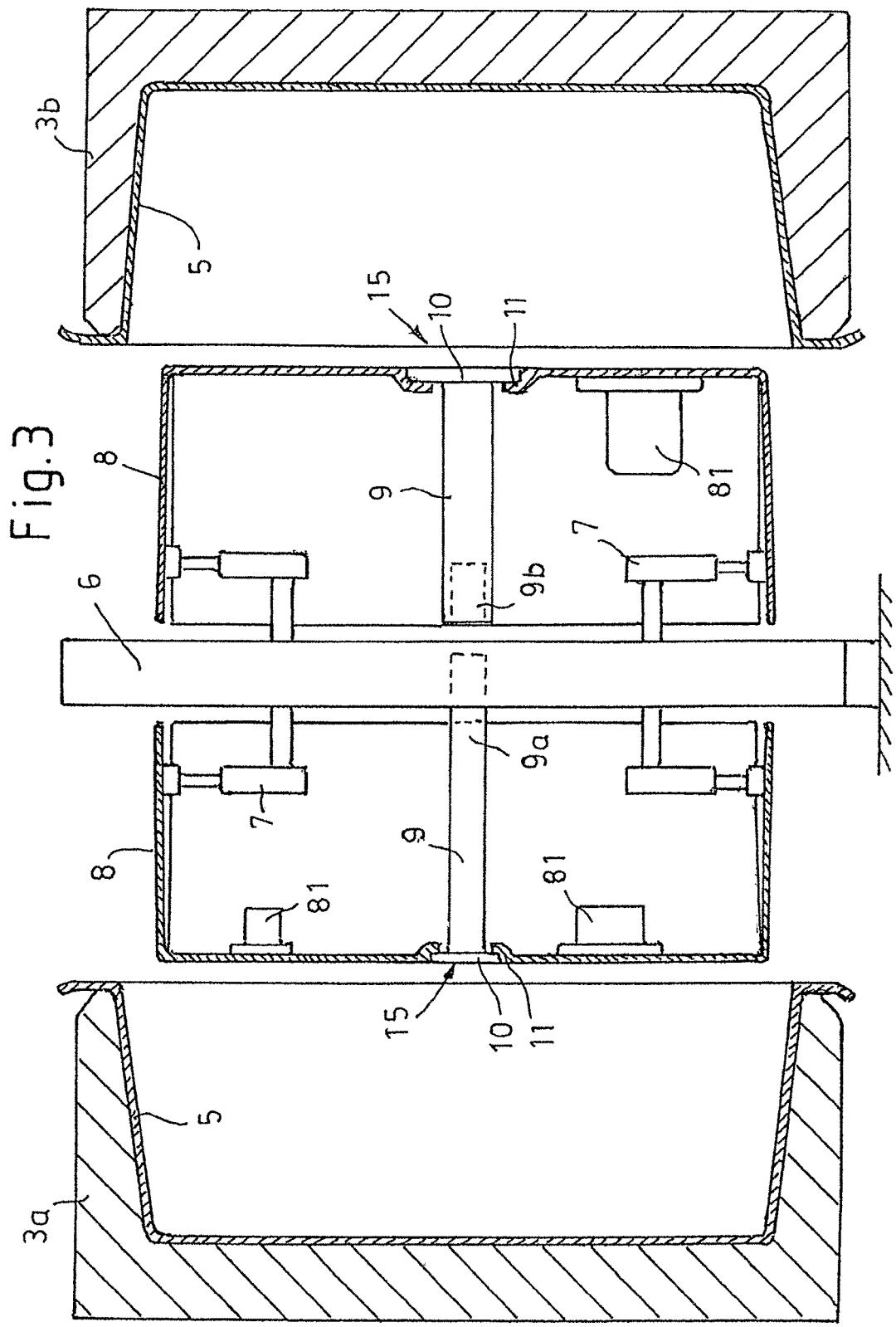

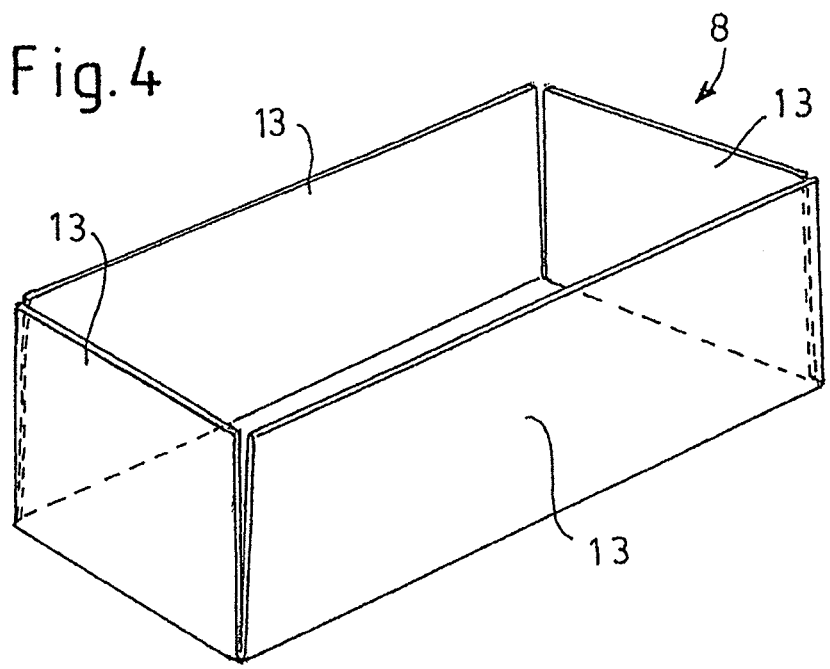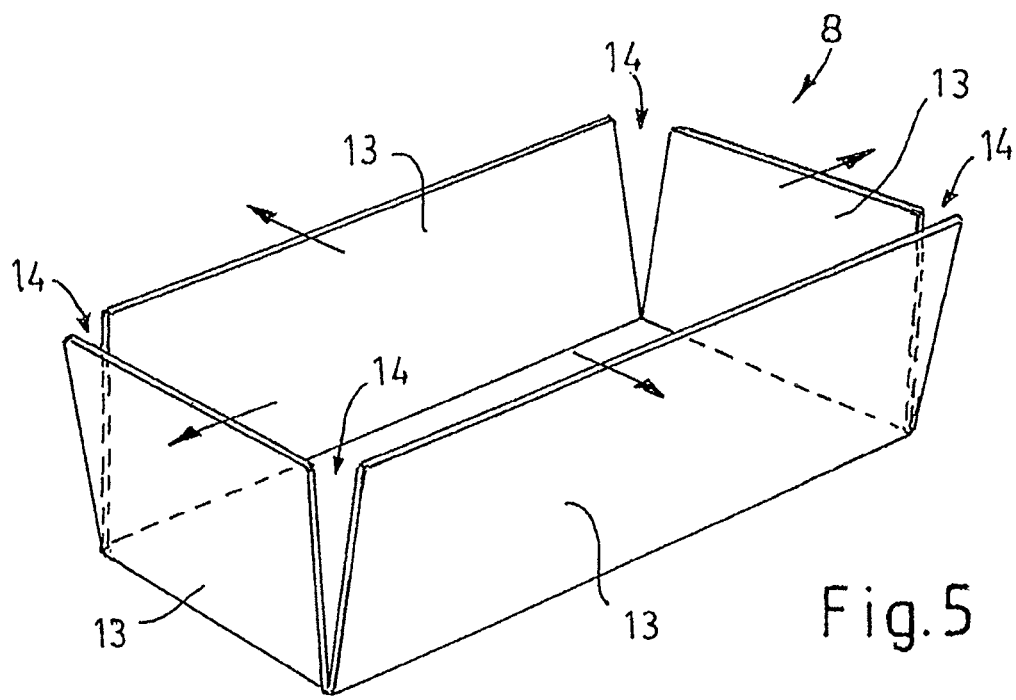

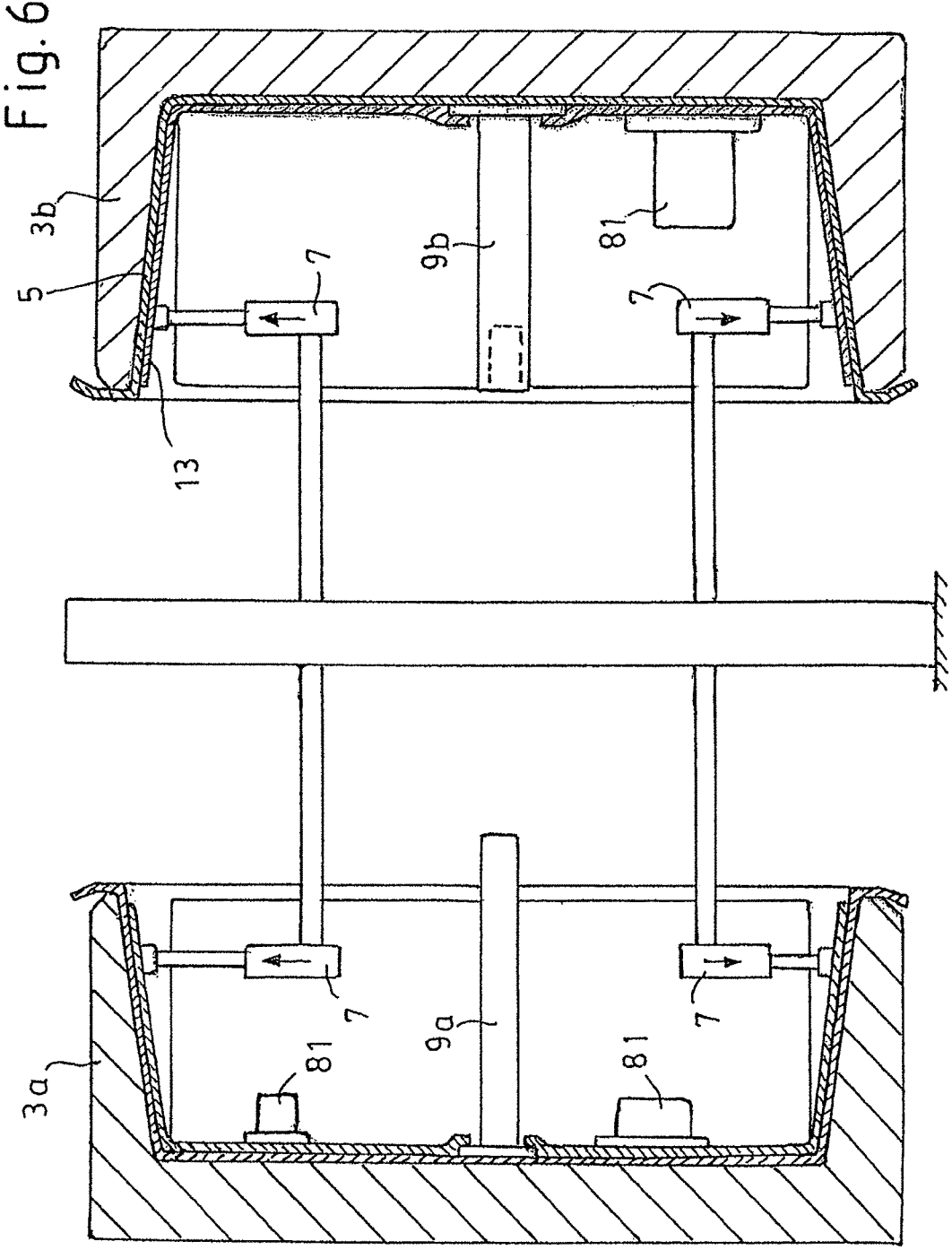

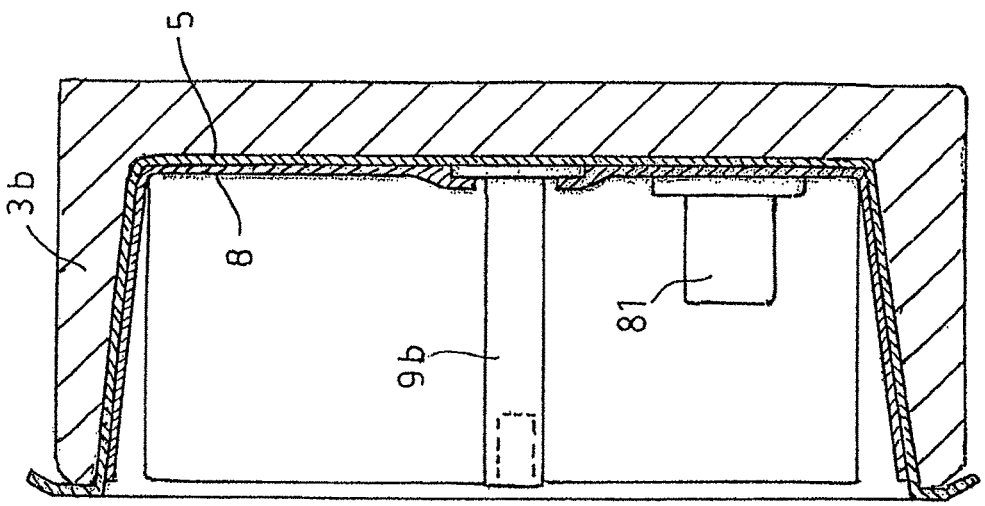
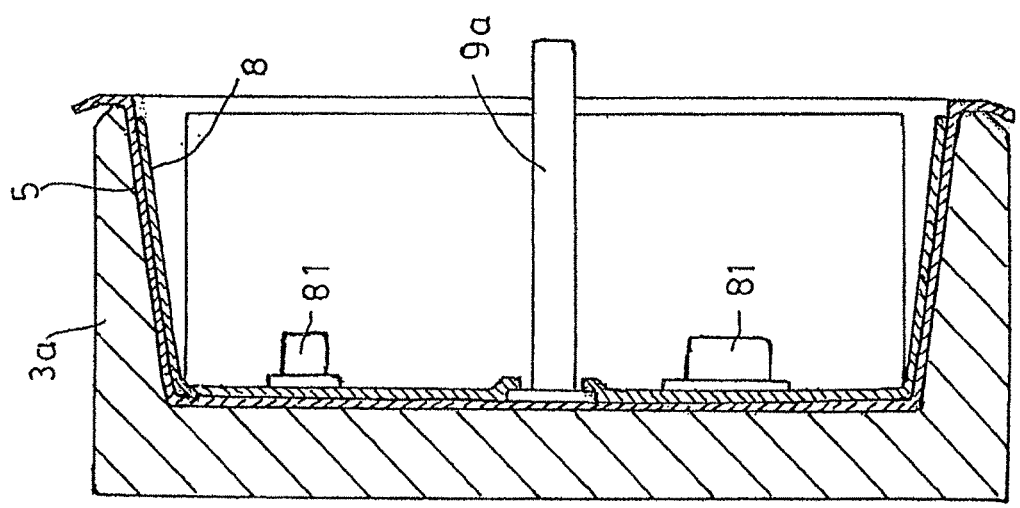
Fig.8

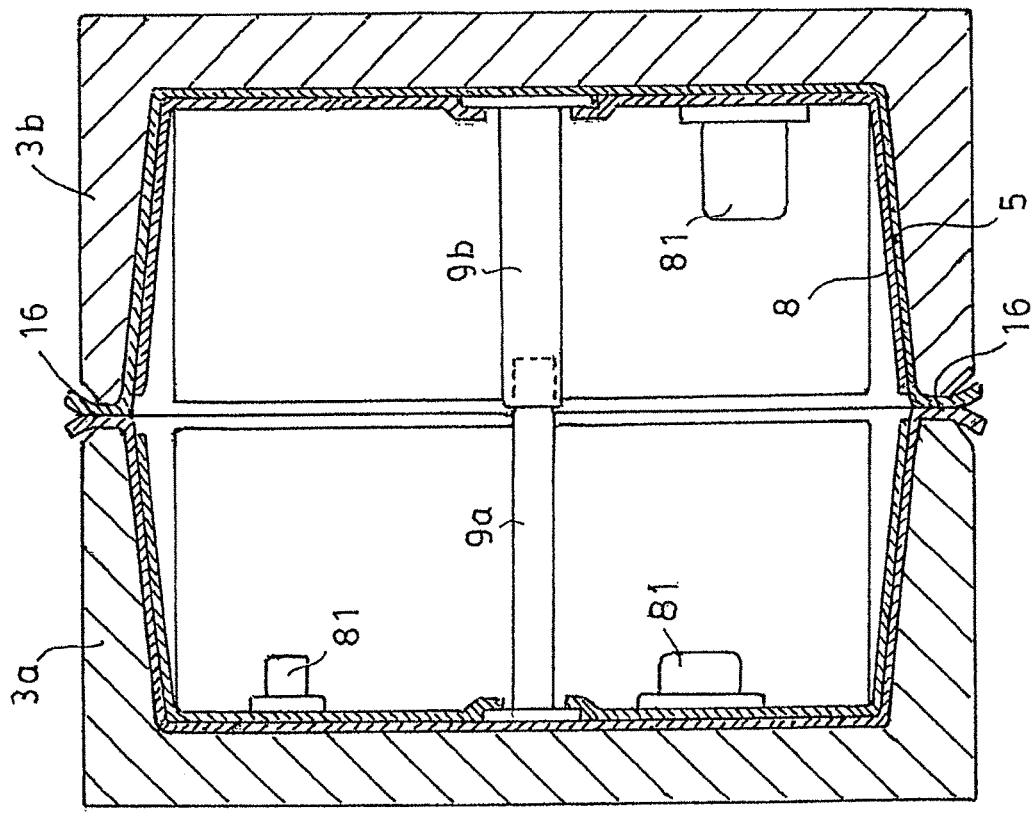

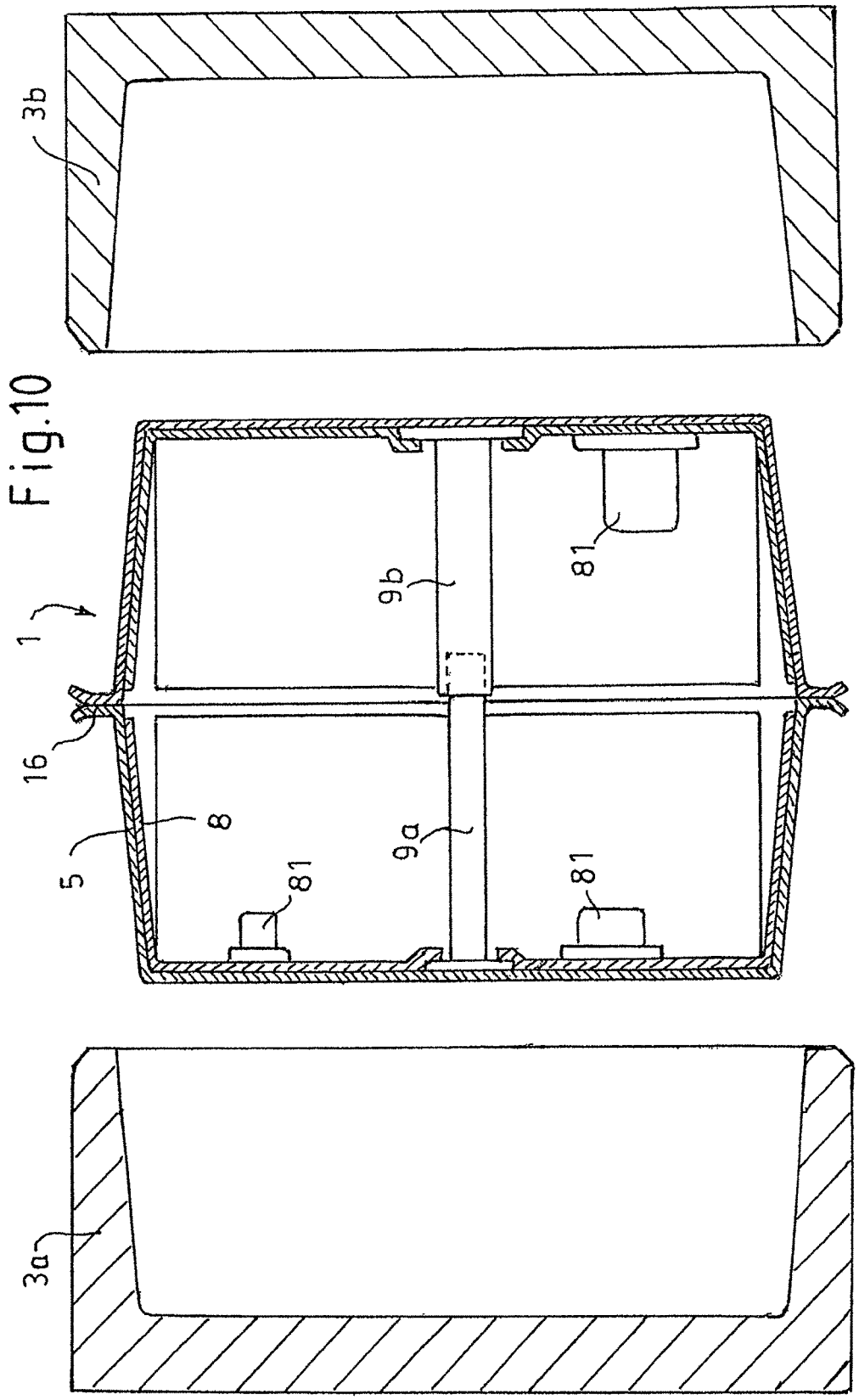

EXTRUSION-BLOW-MOLDED FUEL TANK OF THERMOPLASTIC MATERIAL AND METHOD FOR THE PRODUCTION THEREOF

The invention relates to an extrusion-blow-molded fuel tank of thermoplastic material comprising a tank wall of a composite of various layers obtained in various production operations, at least one first layer comprising at least one shell-shaped supporting shell and a second layer of a thermoplastic material forming an adhesive bond with the supporting shell, and the supporting shell having a greater strength than the second layer.

The invention also relates to a method for producing a fuel tank, in particular a method for producing a fuel tank of the aforementioned type. A fuel tank of the type mentioned at the beginning and a method for the production thereof are known for example from DE 10 2010 027 096 A1. Such plastic fuel tanks are usually multi-layer systems based on HDPE, often comprising a multi-layer wall structure with barrier layers for hydrocarbons. Fuel tanks of plastic are obtained for example by coextrusion of multi-layer preforms, which are re-shaped to form a closed tank either by extrusion blow molding or thermoforming or comparable processes. The joining of prefabricated cured shell-shaped semifinished products by welding the edges of the semifinished products is also known.

As already described at the beginning in DE 10 2010 027 096 A1, in the case of plastic fuel tanks the dimensional stability of the tank under the sustained effects of a force or pressure is a problem. As is known, polyethylene has a tendency to creep under long-term stress, which under some circumstances is problematic with regard to the dimensional stability of a large tank. Depending on the size of the differential pressure occurring between the interior of the tank and the atmosphere, there may also be short-term deformations of the tank, which under some circumstances are not desirable from the aspect of volume constancy of the tank. Therefore, various measures are described in the prior art, in particular that of supporting the large-area tank walls of fuel tanks against one another in such a way that short-term and long-term deformations of the tank are kept within tolerable limits. Often, fuel tanks with inserts arranged in them, for ventilating and venting and also for feeding fuel to the engine of a motor vehicle, are designed as essentially pressureless systems, so that the question of volume constancy and the question of permanent dimensional change as a result of creeping of the material do not play any appreciable role.

As likewise already described in DE 10 2010 027 096 A1, it is desirable in particular in the case of modern hybrid vehicles to be able to hermetically seal off fuel tanks over a considerable period of time, so that the pressure resistance of the tank and also the dimensional stability of the tank under pressure take on special importance, in particular in the case of fuel tanks for hybrid vehicles. This particularly also has to do with the fact that, in the case of hybrid vehicles, the duration and number of possible backflushing cycles of the fuel vapor filter is restricted, and the fuel vapor filter can only be designed with a limited hydrocarbon adsorption capacity on account of the installation space.

Therefore, for stabilizing a fuel tank, it is proposed in DE 10 2010 027 096 A1 to produce it in a multi-shell form with an outer layer of a fiber composite material. This sandwich construction has proven to be particularly strong and stable as well as pressure-resistant. The tank has an outer, relatively stiff and lightweight layer, whereas the inner layer has a certain compliance and, in particular, ensures the leak-tightness of the "fuel tank" system as a whole, since for example the inner layer may be formed as a multi-layer extrudate with barrier layers for hydrocarbons. This tank also has the advantage that, in the event of a crash, the outer layer can absorb corresponding shock loads.

However, the method for producing such a fuel tank is relatively complex, since the application of an outer supporting shell requires that the supporting shell must be geometrically adapted exactly to the given tank contour. Under some circumstances, the swelling of the plastic of the inner shell must be taken into account. The provision of venting systems is likewise relatively complex in the case of this tank. Finally, a relatively simple geometry of the supporting shells requires a considerable loss of volume.

The invention is therefore based on the object of improving a fuel tank of the type mentioned at the beginning while retaining the advantages of the fuel tank described in DE 10 2010 027 096 A1.

The object on which the invention is based is achieved by an extrusion-blow-molded fuel tank of thermoplastic material comprising a tank wall of a composite of various layers obtained in various production operations, at least one first layer comprising at least one shell-shaped supporting shell and a second layer of a thermoplastic material forming an adhesive bond with the supporting shell, and the supporting shell having a greater strength than the second layer, the fuel tank being distinguished by the fact that the supporting shell forms an inner layer of the tank and the second layer forms an outer skin of the tank.

This gives rise to various advantages. On the one hand, it is no longer necessary to adapt the supporting shell exactly to the given tank contour, on the other hand such an arrangement also has the advantage that the joining of the shells forming the outer skin in the tool is made significantly easier. Finally, inserts, such as for example ventilating and venting valves, filling-level indicators, feed units, internal baffles, etc., can be attached relatively easily to the supporting shell in an advantageous way. These inserts may for example be provided premounted on the supporting shell.

The outer skin of the tank may be formed in a known way as a multi-layer co-extrudate of thermoplastic material based on HDPE with EVOH barrier layers.

The fuel tank according to the invention may for example comprise at least one supporting cage or a supporting housing made up of at least two supporting shells, the advantage of such an arrangement also being seen in the fact that the supporting cage or the supporting housing does not necessarily have to be completely closed, since the sealing of the system is ensured by the outer skin. At least one supporting shell, preferably two supporting shells forming a supporting cage or a supporting housing, are respectively connected in a material-bonding and/or form-fitting manner to the outer skin. The supporting shell may for example have been welded to the outer skin, but may also have been adhesively bonded to the outer skin with the assistance of an adhesion promoter, for example in the form of an LDPE. Finally, a combination of a form fit and a material bond is also possible, for example the supporting shell may be provided with corresponding through-holes or apertures, through which the material of the respectively outer shell or the outer skin can pass and flow behind.

In the case of a further preferred variant of the tank according to the invention, it is provided that at least two supporting shells, forming a supporting housing or supporting cage, are connected to one another by means of at least one element absorbing at least tensile forces when the tank is subjected to internal pressure. Such an element absorbing tensile forces may for example be a rod- or column-shaped, one- or multi-part tie bar. For example, this tie bar may be of a two-part form and be respectively provided at the ends with a base, which engages behind a supporting shell.

In the case of a particularly advantageous and expedient configuration of the tank according to the invention, it is provided that at least one of the supporting shells is formed as a component carrier for functional components of the tank, preferably with premounted functional components. The functional components may be arranged in an ideal "layout" on the supporting shells. They may have been riveted, screwed, adhesively bonded or connected in some other suitable way to the supporting shells. This makes it possible to preconfigure the entire internals of the tank in a premounted state, so that, in the simplest case, the unit that is completely fitted out and operational in the sense of comprising interconnected inserts can be inserted into the shells of the fuel tank forming the outer skin while they are being molded.

At least one supporting shell may for example be formed from a fiber composite material, preferably with a thermoplastic or thermosetting matrix. For example, so-called organometallic sheets of a knitted fiber mat embedded in a thermoplastic or thermosetting matrix may be used here. Glass fibers, carbon fibers or aramid fibers come into consideration as fibers. The task of the inner, relatively stiff supporting shells is to intercept and prevent deformations of the HDPE tank wall as they arise. The tie bar that is preferably provided between the supporting shells absorbs further deformation forces, which could have the effect of driving the supporting shells apart when the system is subjected to internal pressure.

A preferred variant of the tank according to the invention comprises two supporting shells, which are respectively engaged from behind by a two-part tie bar.

The supporting shells are expediently adapted approximately to the given internal contour of the tank, it being possible for this contour to be formed such that it is slit and/or broken through for example in corner regions of a surrounding side wall or skirt, in order to achieve bonding with the second, outer layer over the full surface area and the full circumference during production. As already mentioned above, at least one supporting shell may be welded or adhesively bonded to the outer skin.

If the supporting shell has for example a thermoplastic matrix, welding of the supporting shell to the second, outer shell may have been achieved during the production of the tank by using the heat of extrusion of the outer shell.

Expediently, at least one of the supporting shells is adapted to the internal contour of the tank.

The invention also comprises a method for producing a fuel tank, comprising the molding of two shell-shaped semifinished products of thermoplastic material in a multi-part tool forming a mold impression, and the joining of the shells to form an essentially closed hollow body, the method comprising first introducing at least one molten, plastic perform into the mold impression and at least partially molding the preform against the mold and then introducing at least one self-supportingly stiff supporting shell into the mold impression, the supporting shell being connected to the already partially molded preform to form an inner layer of the tank and the multi-layer shells of the tank thus obtained being joined together in a further method step.

For example, the method may comprise the extrusion of a tubular preform, which is cut open to form two sheet-like preforms in web form, which by using the heat of extrusion are molded into shells, which then form the outer shells of the tank or the outer skin thereof.

Alternatively, the method may comprise the extrusion of at least two sheet-like preforms in web form, which by using the heat of extrusion are molded into shells, which then form the outer skin of the tank.

The supporting shells may for example be introduced into the opened molding tool and welded and/or adhesively bonded to the already at least partially molded preforms by using joining pressure. In the case of such a method cycle, it may be provided first to bring for example two preforms in web form between the mold halves of an opened three-part tool with a central frame/mounting carrier/tool divider or the like. In a first method step, the mold halves may for example be displaced against a tool divider, which respectively closes off the preforms with respect to the part-cavities. Then, by using differential pressure, a partial molding of the preforms into the cavities of the blow-molding tool is brought about. This may take place for example by evacuating the respective mold cavities and/or in a known way by subjecting them to blowing air. Then, the molding tool is opened. By means of a mounting carrier brought between the opened halves of the molding tool or by means of an industrial robot (3D manipulator), the supporting shells are then pressed into the previously shaped preforms, on the side thereof that is facing the inner side of the tank. This may for example involve welding the supporting shells to the outer shells. The supporting shells have previously been fitted out with correspondingly provided inserts. On their sides that are facing the outer skin, nipples or the like may be provided for example, passing through the preforms or the second shells when the supporting shells are inserted, in order to produce a tank opening and/or a connection for venting lines.

In the case of an advantageous variant of the method, it is provided that the introduction of the supporting shells takes place by deforming the still plastic, inner wall of the preforms. This has the advantage that the finished tank has a constant and defined wall thickness in large regions.

As already mentioned above, the supporting shells have expediently been fitted out with inserts in a given position or in a given layout before being introduced into the mold impression. Furthermore, the method comprises that the supporting shells are respectively fitted out with tie bars engaging behind them in the installation position. For example, the tie bars of two supporting shells may be positioned in such a way that the tie bars of two supporting shells are connected to one another in a form-fitting manner, for example locked together, during the joining of the shell form.

The invention is explained below on the basis of an advantageous exemplary embodiment that is represented in the drawing, in which:

FIG. 1 shows a schematic sectional view through a blow-molding tool in the production of the extrusion-blow-molded fuel tank according to the invention, the representation showing the introduction of the preforms into the blow-molding tool, FIG. 2 shows a view corresponding to FIG. 1, which illustrates the molding of the preforms in the mold, FIG. 3 shows a view corresponding to FIG. 2, which shows the introduction of the supporting shells into the mold impression, FIGS. 4 and 5 show schematic representations of the supporting shells, FIG. 6 shows a method step of the method according to the invention in the fixing of the supporting shells on the shells forming the outer skin of the tank, FIG. 7 shows a view corresponding to FIG. 6 after complete attachment of the supporting shells, FIG. 8 shows a view corresponding to FIG. 7, without the manipulator represented in FIG. 6 for the purpose of attaching the supporting shells, FIGS. 8 and 9 show the operation of joining the tank shells to form a closed tank and FIG. 10 shows the finished tank demolded from the tool.

FIGS. 1 to 3 first illustrate the method according to the invention for producing the fuel tank 1 according to the invention. Therefore, the method is discussed first hereinafter.

The method described below comprises the extrusion of two preforms 2 in web or strip form of thermoplastic material. The plastic has previously been plasticated in an extruder and fed to an extrusion head, which for the sake of simplicity is only represented in an indicated manner. The extrusion head comprises two slot dies, from which the extrudate in melt form emerges in the form of sheet-like preforms 2 in web form. In the case of the exemplary embodiment described, the preforms 2 are extruded directly between the opened halves 3a, 3b of a blow-molding tool 3. The halves 3a, 3b of the blow-molding tool 3 respectively form a part-cavity and define a mold impression for the molding of the preforms 2 into shell-shaped semifinished products, which in a further method step are joined to form a closed tank. As soon as the preforms 2 have been extruded to their full length, the halves 3a, 3b of the blow-molding tool 3 are displaced against a tool divider 4, as is represented in an indicated manner in FIG. 2. The tool divider 4 may be formed as a plate or surrounding sealing frame, which respectively seals off the part-cavity of the halves of the blow-molding tool 3 in such a way that the preforms can be molded into shells 5 by using differential pressure in the part-cavities, as is represented in FIG. 2. This may be accomplished either by evacuation of the part-cavities or else by subjecting them to blowing pressure by means of a blowing pin that is not shown or outlets that are not shown in the tool divider 4.

For the purposes of this application, in the case of the method step described in FIGS. 1 and 2 reference is only made to a partial molding of the preforms 2 into shells, since the shells 5 are only molded to the extent that is required for them to be brought to bear against the contour of the tool.

In a further method step, the halves 3a, 3b of the blow-molding tool 3 are opened again. The tool divider 4 is removed from the intermediate space between the halves 3a, 3b of the blow-molding tool 3, after which (FIG. 3) a mounting carrier 6 is brought between the halves 3a, 3b of the blow-molding tool. The mounting carrier 6 may take the form of a frame or a platen with pneumatic and/or hydraulic devices or a core with the same such devices. In the present case, pneumatic adjusting devices 7, which respectively receive a supporting shell 8 on both sides of the mounting carrier 6, are provided on the mounting carrier 6. The supporting shells 8 respectively consist of a so-called organometallic sheet, for example an aramid-fiber mat embedded in a thermoplastic matrix. The supporting shells 8 are self-supportingly stiff and dimensionally stable. They have been produced in a separate method step. The contour thereof is in the present case box-shaped and corresponds approximately to the given internal contour of the finished fuel tank 1. The supporting shells have been previously fitted out with functional components 81 and also with in each case a column-shaped support 9.

For the purposes of the present application, functional components 81 are understood as meaning the internals required for the operation of a fuel tank for a motor vehicle, such as venting valves, rollover valves, surge tanks, pumps and sensors. The functional components 81 may be connected to one another by lines. The complete fabrication of the supporting shells with functional components arranged on them and connected to one another by lines may have been performed outside the molding and joining operation that is represented in the figures. The functional components 81 have been attached to the supporting shells 8 in an ideal layout for the fuel tank 1 concerned.

The supporting shells 8 lying opposite the supports 9 respectively comprise plug-in elements 9a, 9b, which have been formed so as to complement one another and fit in one another, are for example of a cylindrical form and may be respectively equipped with locking means that are not represented. In addition, the supports 9 may be respectively provided with a base, which engages behind the supporting shell 8 concerned, in the region of a depression 11. The plug-in elements 9a, 9b of the supports 9 pass through corresponding openings 15 in the bottom of the supporting shells 8.

On their side facing the shells 5, the supporting shells 8 may be provided with reinforcing ribs, channels or a profiling.

The pneumatic adjusting devices are formed as pneumatic cylinders, which are respectively provided with receptacles 12 for the supporting shells 8.

With the aid of the pneumatic adjusting devices, which can for example be retracted and extended in and counter to the possible adjusting movement of the halves 3a, 3b of the blow-molding tool 3, the supporting shells 8 are brought into the cavities of the blow-molding tool 3 and press there against the still molten shells 5. This may be performed if appropriate with an adhesion promoter that is not shown interposed. If the supporting shells 8 have a thermoplastic matrix, they are previously heated by means of a heating device that is not represented and then pressed against the shells 5.

As is represented in FIG. 6, the pneumatic adjusting devices 7 are provided with pneumatic cylinders, which allow an extending movement of the receptacles 12 transversely in relation to the opening and closing direction of the halves 3a, 3b of the blow-molding tool 3, so that the surrounding skirt 13 of the supporting shell 8 can be pressed together with the opposing inner wall of the shells 5.

Since the supporting shells 8 are a self-supportingly stiff construction, a corresponding compliance of the skirt 13 is ensured by slits 14 provided in the corner regions of the box-shaped contour. Once the supporting shells 8 have been connected to the preforms 2 molded into shells 5, the mounting carrier 6 is moved away between the halves 3a, 3b of the blow-molding tool 3.

In a further method step, the halves 3a, 3b of the blow-molding tool are moved together, the halves concerned of the fuel tank being respectively joined together as a composite of the thermoplastic shells 5 and the supporting shells 8, to be precise essentially by welding of the surrounding periphery 16 of the shells 5. The pin-shaped plug-in end 9a of one supporting shell 8 thereby penetrates into the socket-shaped plug-in element 9b on the other supporting shell. The plug-in elements 9a and 9b lock together, so that in the finished fuel tank 1 they form a tie bar connecting the walls thereof.

LIST OF DESIGNATIONS

1 Fuel tank
2 Preforms
3 Blow-molding tool
3a, 3b Halves of the blow-molding tool
4 Tool divider
5 Shells
6 Mounting carrier
7 Pneumatic adjusting device
8 Supporting shell
81 Functional components
9 Support
9a, 9b Plug-in elements
10 Base
11 Depression
12 Receptacles
13 Skirt
14 Slits
15 Openings
16 Periphery of the shells

What is claimed is:

1. A fuel tank comprising: a tank wall of a composite having a plurality of layers, the plurality of layers comprising at least a first layer and a second layer, the first layer having an outer surface, the second layer having an inner surface, the outer surface of the first layer and the inner surface of the second layer facing each other and at least one of welded and bonded to each other, the second layer formed of a thermoplastic material, the first layer provided by at least one shell-shaped supporting shell, the supporting shell having a greater strength than the second layer, and the supporting shell forms an inner layer of the tank and the second layer forms an outer skin of the tank, wherein: the first layer comprises a first polymer material; the second layer comprises a second polymer material; and the first polymer material and the second polymer material are different.

2. The fuel tank as claimed in claim 1, wherein the fuel tank comprises a supporting cage or a supporting housing made up of at least two supporting shells.

3. The fuel tank as claimed in claim 1, wherein at least one supporting shell is connected in a material-bonding and/or form-fitting manner to the outer skin of the tank.

4. The fuel tank as claimed in claim 1, wherein at least two supporting shells, forming a supporting housing or supporting cage, are connected to one another by at least one element absorbing at least tensile forces when the tank is subjected to internal pressure.

5. The fuel tank as claimed in claim 1, wherein at least one of the supporting shells is formed as a component carrier for functional components of the tank.

6. The fuel tank as claimed in claim 1, wherein at least one supporting shell is formed from a fiber composite material.

7. The fuel tank as claimed in claim 1, comprising two supporting shells, which are engaged from behind by a two-part tie bar.

8. The fuel tank as claimed in claim 1, wherein at least one supporting shell is welded and/or adhesively bonded to the outer skin.

9. The fuel tank as claimed in claim 1, wherein at least one supporting shell is adapted to the internal contour of the tank.

10. The fuel tank as claimed in claim 1, wherein the supporting shell comprises a sheet formed into a plurality of planar side wall sections of a three-dimensional shape.

11. The fuel tank as claimed in claim 1, wherein the supporting shell has a box-shaped contour with at least one slit provided in a corner region of the box-shaped contour.

12. A fuel tank comprising: a tank wall having a plurality of layers, the plurality of layers comprising at least a first layer and a second layer, the first layer disposed as an inner layer of the tank, and the second layer disposed as an outer layer of the tank, the first layer formed of a composite material comprising fibers in a matrix and having an outer surface, the second layer formed of thermoplastic and having an inner surface, the first layer provided by at least one box-shaped inner shell having an outer surface, the second layer provided by at least one box-shaped outer shell having an inner surface, the outer surface of the inner shell and the inner surface of the outer shell facing each other and bonded to each other, wherein: the matrix of the first layer comprises a first polymer material; the thermoplastic of the second layer comprises a second polymer material; and the first polymer material and the second polymer material are different.

13. The fuel tank as claimed in claim 12, wherein:
the at least one box-shaped inner shell having an outer surface further comprises a first box-shaped inner shell having an outer surface, and a second box-shaped inner shell having an outer surface,
the at least one box-shaped outer shell having an inner surface further comprises a first box-shaped outer shell having an inner surface, and a second box-shaped outer shell having an inner surface,
the outer surface of the first inner shell and the inner surface of the first outer shell facing each other and bonded to each other,
the outer surface of the second inner shell and the inner surface of the second outer shell facing each other and bonded to each other.

14. The fuel tank as claimed in claim 13, wherein:
the inner surface of the first outer shell and the inner surface of the second outer shell facing each other and bonded to each other.

15. The fuel tank as claimed in claim 14, wherein:
the inner surface of the first outer shell and the inner surface of the second outer shell are bonded to each other along a periphery of the fuel tank.

16. The fuel tank as claimed in claim 13, wherein:
the first inner shell and the second inner shell form an interior cage or interior housing of the fuel tank.

17. The fuel tank as claimed in claim 13, wherein:
the first inner shell and the second inner shell are connected to each other by at least one element arranged to absorb at least tensile forces when the tank is subjected to internal pressure.

18. The fuel tank as claimed in claim 17, wherein:
the at least one element comprises a tie-bar.

19. The fuel tank as claimed in claim 13, wherein:
at least one of the first inner shell and the second inner shell is a component carrier for at least one component within the tank.

20. The fuel tank as claimed in claim 12, wherein:
the outer surface of the inner shell and the inner surface of the outer shell facing each other are at least one of welded and adhesively bonded to each other.

21. The fuel tank as claimed in claim 12, wherein:
the composite material of the first layer further comprises a fiber mat encapsulated in a thermoplastic matrix or a thermosetting matrix.

22. The fuel tank as claimed in claim 12, wherein:
the first outer shell and the second outer shell form a hollow body.

23. The fuel tank as claimed in claim 21, wherein: the fiber mat is encapsulated in the thermoplastic matrix; and the thermoplastic matrix does not form the second layer.

24. The fuel tank as claimed in claim 21, wherein: the fiber mat is encapsulated in the thermosetting matrix; and the thermosetting matrix does not form the second layer.

25. The fuel tank as claimed in claim 12, wherein:
the thermoplastic of the second layer is an extrudate.

26. The fuel tank as claimed in claim 1, wherein:
the thermoplastic material of the second layer is an extrudate.

27. The fuel tank as claimed in claim 1, wherein: the thermoplastic material of the second layer does not form the first layer.

* * * * *